(12) United States Patent
Tay

(10) Patent No.: US 8,477,757 B2
(45) Date of Patent: Jul. 2, 2013

(54) DMR PRIVATE NETWORK COMMUNICATION IMPLEMENTATION METHOD, TERMINAL, RELAY STATION AND SYSTEM

(75) Inventor: Wanfook Tay, Shenzhen (CN)

(73) Assignee: Hytera Communications Corp., Ltd., Shenzhen (CN)

(*) Notice: Subject to any disclaimer, the term of this patent is extended or adjusted under 35 U.S.C. 154(b) by 0 days.

(21) Appl. No.: 12/672,662

(22) PCT Filed: Sep. 28, 2008

(86) PCT No.: PCT/CN2008/072598
§ 371 (c)(1),
(2), (4) Date: Feb. 8, 2010

(87) PCT Pub. No.: WO2010/034165
PCT Pub. Date: Apr. 1, 2010

(65) Prior Publication Data
US 2012/0002684 A1    Jan. 5, 2012

(51) Int. Cl.
*H04B 7/212* (2006.01)
*H04B 1/60* (2006.01)
*H04J 3/06* (2006.01)

(52) U.S. Cl.
USPC .......... 370/347; 370/322; 370/350; 370/442; 455/9

(58) Field of Classification Search
USPC ................. 370/315, 321, 322, 324, 328, 329, 370/345, 347, 350, 442; 455/7, 9, 11.1
See application file for complete search history.

(56) References Cited

U.S. PATENT DOCUMENTS

| 5,276,713 A | 1/1994 | Kato et al. |
| 6,574,199 B1 | 6/2003 | Young et al. |

(Continued)

FOREIGN PATENT DOCUMENTS

| CN | 101184011 A | 5/2008 |
| EP | 0486692 A1 | 5/1992 |

(Continued)

OTHER PUBLICATIONS

European Telecommunications Standards Institute, "Electromagnetic compatibilityand Radio spectrum Matters (ERM); Digital Mobile Radio (DMR) Systems; Part 1: DMR Air Interface (AI) protocol", (Jan. 2006), V1.2.1.*

(Continued)

*Primary Examiner* — Paul H Masur
(74) *Attorney, Agent, or Firm* — Harness, Dickey & Pierce, P.L.C.

(57) ABSTRACT

The present invention provides an implementation method, terminal, relay station and system for DMR private communication. A DMR private network communication terminal includes a communication module for receiving CACH information, receiving and transmitting DMR private network communication, a synchronization module for establishing synchronization and determining which time slot the received DMR private network communication occupies based on the received CACH information; and controlling the communication module to make a response for the received DMR private network communication in the time slot. The present invention further provides an implementation method, relay station and system for DMR private network communication. In this case, the stability of the idle time slot can be ensured, and other DMR private network communication terminals can initiate new DMR private network communication by locking unoccupied idle time slot; thereby achieving a full usage of the frequency width of 12.5KHz.

4 Claims, 4 Drawing Sheets

U.S. PATENT DOCUMENTS

| | | | | |
|---|---|---|---|---|
| 2006/0221887 | A1* | 10/2006 | Newberg et al. | 370/328 |
| 2008/0008153 | A1* | 1/2008 | Hiben et al. | 370/344 |
| 2008/0212699 | A1 | 9/2008 | Imaeda et al. | |
| 2009/0303923 | A1* | 12/2009 | Wiatrowski et al. | 370/328 |
| 2010/0056193 | A1* | 3/2010 | LoGalbo et al. | 455/511 |

FOREIGN PATENT DOCUMENTS

| | | |
|---|---|---|
| JP | 63-31235 A | 2/1988 |
| JP | 01-133441 A | 5/1989 |
| RU | 2293442 C1 | 2/2007 |
| WO | WO 2009151975 A2 | 12/2009 |

OTHER PUBLICATIONS

First Russian Office Action regarding Application No. 2010104241/09(006006). Translation provided by Unitalen Attorneys At Law.

Electromagnetic compatibility and Radio spectrum Matter (ER); Digital Mobile Radio (DMR) Systems; Part 1: DMR Air Interface (A1) protocol. ETSI TS 102 361-1 V1.4.5. Dec. 2007.

Electromagnetic compatibility and Radio spectrum Matter (ERM); Digital Mobile Radio (DME) General System Design. ETSI TR 102 398 V1.1.2. May 2008.

Electromagnetic compatibility and Radio spectrum Matters (ERM); Digital Mobile Radio (DMR) General System Design, ETSI TR 102 398 v1.1.2 (May 2008). Sections 5 and 8.

Electromagnetic compatibility and Radio spectrum Matters (ERM); Digital Mobile Radio (DMR) Systems; Part 1: DMR Air Interface (AI) protocol. ETSI TS 102 361-1 v1.4.5 (Dec. 2007) Sections 4.2-4.6 and 5.2.

Russian Decision on Grant regarding Application No. 2010104241, dated Jan. 10, 2012. Translation provided by Unitalen Attorneys at Law.

Australian Office Action dated Sep. 25, 2012.

* cited by examiner

DMR PRIVATE NETWORK COMMUNICATION IMPLEMENTATION METHOD, TERMINAL, RELAY STATION AND SYSTEM

TECHNICAL FIELD

The present invention relates to a private network communication technology, more particularly to a DMR private network communication implementation method, terminal, relay station and system.

BACKGROUND ART

As a European private network communication standard recently issued by ETSI (European Telecommunications Standards Institute) for taking place of the analog Private Mobile Radio (PMR), the Digital Mobile Radio (DMR) standard is advantageous in large coverage area, high transmission rate, high spectrum efficiency and excellent energy-saving efficiency. Therefore, private network communication products based on DMR standard have a promising future in the market.

The DMR standard uses Time Division Multiple Access (TDMA) frame structure with double time slot. FIG. 1 is a schematic view of DMR TDMA frame structure in direct mode. The so-called direct mode means that communication terminals communicate with each other directly without a relay station. As shown in FIG. 1, the DMR TDMA frame includes two completely identical time slots with each in a length of 30 ms, and each of the time slots is further divided by a middle synchronous pattern field into two loads with the same length. Each of the time slots is provided with a protective interval in a length of 1.25 ms at two ends thereof. Accordingly, the interval between the time slots is 2.5 ms.

In relay mode, Common Assignment Channel (CACH) information is inserted into the DMR TDMA frame illustrated in FIG. 1 by the relay station to broadcast time slot number and occupant condition of each time slot. FIG. 2 is a schematic view of DMR TDMA frame structure at a down direction in relay mode. As shown in FIG. 2, CACH information in a length of 2.5 ms is inserted by the relay station into a protective internal in a length of 2.5 ms between the two time slots, and the information is used to indicate the time slot number and the occupant condition of the subsequent time slot. Accordingly, there is CACH information instead of a protective interval between time slots in relay mode.

In relay mode, the existing implementation method for the DMR private network communication sets a communication time slot for a communication terminal in advance, and once set, the communication time slot for one communication terminal cannot be changed. For the purpose of ensuring that each of the communication terminals in the same group can communicate with each other, the communication time slot assigned in advance for each of the communication terminals in the same group is the same. Meanwhile, in order to ensure no interference of communications among different groups, communication terminals with different communication time slot are used by different groups. In a process of communication, the relay station periodically transmits CACH information for indication of time slot number and occupant condition of each time slot. The communication terminal receives the CACH information to establish synchronization with the information, thereby locking the preset communication time slot to perform private network communication by the time slot. In this case, different groups perform communication by different time slots, thereby making full use for two time slots in the DMR TDMA frame.

The above implementation method is disadvantageous in that the communication terminal can only perform communication by the preset communication time slot thereof. Accordingly, communication terminals with different communication time slots cannot communicate with each other. As a result, communication terminals in the same group must be provided with the same time slot for communicating with each other. In this case, although two independent channels are set by the DMR protocol itself in a frequency width of 12.5 KHz to support communications of two independent private networks, only one fixed time slot can be used for communications in a group, while the other time slot cannot be used even if it is idle. Accordingly, only a frequency width of 6.25 KHz can be used in one group, and the other frequency width of 6.25 KHz in the 12.5 Khz cannot be used.

Hence, there is need for an implementation solution for the DMR private network communication which is capable of overcoming the defects existed in the prior art.

SUMMARY OF THE INVENTION

The technical problem to be solved by the present invention lies in providing an implementation method, terminal, relay station and system for DMR private communication with respect to the defects existed in the prior art that each of the communication terminals can only communicate with each other using the same time slot in a group, thereby a frequency width of 6.25 KHz instead of a frequency width of 12.5 KHz can be used sufficiently.

The technical solution adopted by the present invention for the solution of its technical problem is as follows:

A DMR private network communication terminal for implementing DMR private network communication in relay mode comprises the following:

a communication module for receiving CACH information and receiving and transmitting DMR private network communication, it further comprises:

a synchronization module for establishing synchronization based on the received CACH information and determining which time slot the received DMR private network communication occupies; and controlling the communication module to make a response to the received DMR private network communication in the time slot.

In the DMR private network communication terminal provided by the present invention, the synchronization module is used for:

locking an idle time slot based on the received CACH information;

controlling the communication module to initiate DMR private network communication in the idle time slot.

The present invention further provides DMR private network communication relay station, and the relay station comprises the following:

A transceiver module for receiving and forwarding DMR private network communication, and it further comprises:

a resolution module for determining which time slot the received DMR private network communication occupies;

controlling the transceiver module to forward the DMR private network communication in the time slot.

The present invention further provides DMR private network communication system for performing DMR private network communication in relay mode, and it at least comprises the following:
 a first DMR private network communication terminal;
 a second DMR private network communication terminal;
 DMR private network communication relay station for transmitting CACH information periodically;
 the first and second DMR private network communication terminal for receiving CACH information to establish synchronization with the DMR private network communication relay station based on the CACH information;
 the first DMR private network communication terminal for initiating DMR private network communication;
 the DMR private network communication relay station for receiving the DMR private network communication and forwarding the received DMR private network communication to the second DMR private network communication terminal;
 the second DMR private network communication terminal for receiving the DMR private network communication forwarded by the DMR private network communication relay station to make a response for the received DMR private network communication;
 the first DMR private network communication terminal for locking an idle time slot based on the received CACH information and initiating the DMR private network communication in the idle time slot;
 the DMR private network communication relay station for receiving the DMR private network communication and determining which time slot it occupies, then forwarding the received DMR private network communication in the time slot;
 the second DMR private network communication terminal for receiving the DMR private network communication forwarded by the DMR private network communication relay station to determine which time slot it occupies and then making a response for the DMR private network communication in the time slot.

The present invention further provides an implementation method for the DMR private network communication for implementing the DMR private network communication in relay mode, and it comprises the following steps:
 S1, initiating DMR private network communication;
 S2, receiving the DMR private network communication to determine which the time slot it occupies and forwarding the DMR private network communication in the time slot;
 S3, receiving the forwarded DMR private network communication to determine which the time slot it occupies and making a response for the DMR private network communication in the time slot.

In the implementation method for the DMR private network communication provided by the present invention, the following step is comprised before the step S1:
 S11, receiving CACH information to establish synchronization based on the CACH information.

In the implementation method for the DMR private network communication provided by the present invention, the step 1 further comprises locking the idle time slot based on the CACH information and initiating the DMR private network communication in the idle time slot.

The implementation of the technical solution of the present invention benefits in the following aspects: since each DMR private network communication only occupies one time slot, the case of the same DMR private communication occupying different time slots at different time can be avoided to ensure the stability of the idle time slot. In this case, other DMR private network communication terminals can initiate new DMR private network communication by locking unoccupied idle time slot, no matter whether those DMR private network communication terminals belong to the same group as the private network communication terminals which are performing the DMR private network communication. In this case, when one time slot is occupied, new DMR private network communication can be initiated in the other time slot, and thereby a full usage of the frequency width of 12.5 KHz can be achieved.

BRIEF DESCRIPTION OF THE DRAWINGS

Further explanation of the present invention is made by accompanying the Drawings and the Detailed Embodiment of the Invention, in the Drawings.

DETAILED DESCRIPTION OF THE EMBODIMENTS OF THE PRESENT INVENTION

For a better understanding of the object, technical solutions and advantages of the present invention, the present invention is further explained in conjunction with the Drawings and the embodiments. It shall be appreciated that the specific embodiments are only used to explain the present invention, and are not used to limit the present invention.

Figure 3:
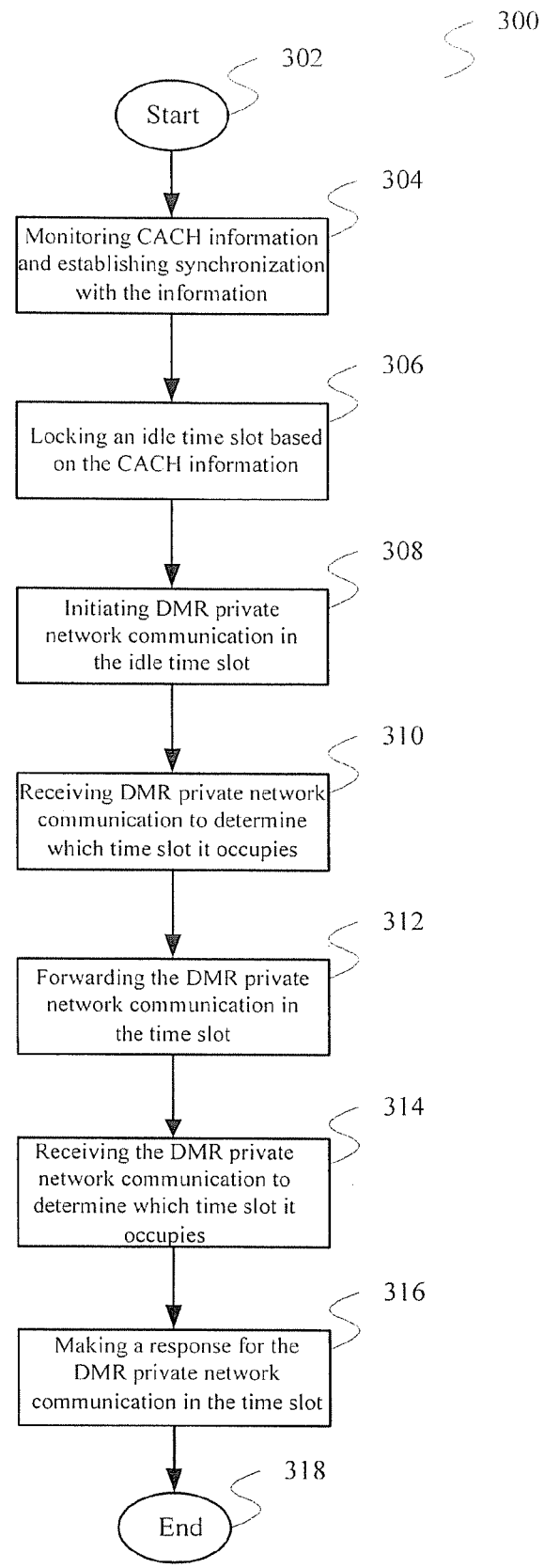
FIG. 3 is a flowchart of the implementation method for the DMR private network communication according to a preferred embodiment of the present invention.

FIG. 3 is a flowchart of the implementation method 300 for the DMR private network communication according to a preferred embodiment of the present invention. As illustrated in FIG. 3, the method 300 starts at the step 302.

Figure 1:
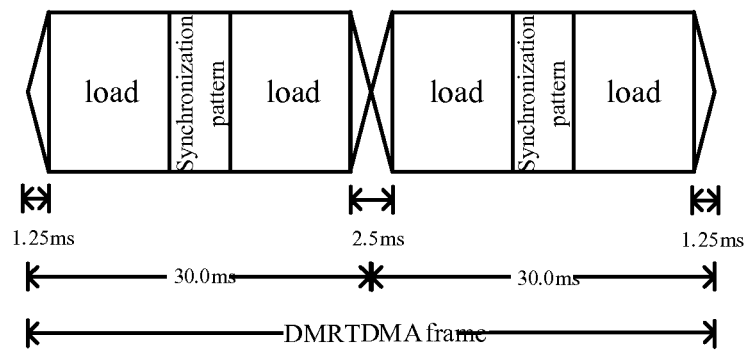
FIG. 1 is a schematic view of the DMR TDMA frame structure in direct mode.
Figure 2:
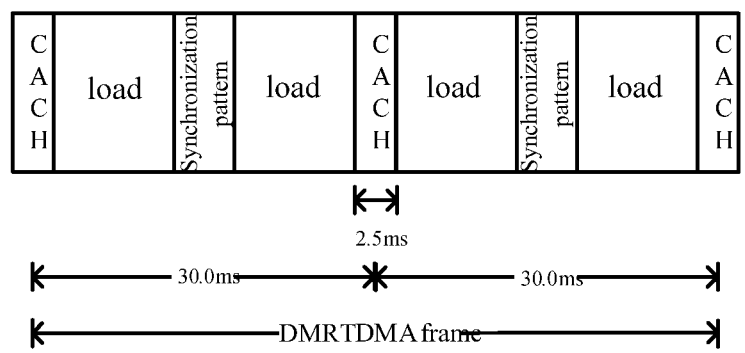
FIG. 2 is a schematic view of the DMR TDMA frame structure in a down direction in relay mode.

Next, at a next step 304, the DMR private network communication terminals (including the initiating terminals and the destination terminals) monitor CACH information which is transmitted by a relay station periodically and establish synchronization with the relay station. In relay mode, the relay station transmits a piece of CACH information in a length of 2.5 ms at intervals of 27.5 ms. As can be seen from the DMR TDMA frame structure in relay mode illustrated in FIG. 2, in relay mode, after monitoring and locking the CACH information, the DMR private network communication terminals can establish synchronization with the relay station based on the CACH information and the length of the time slots of the DMR TDMA frame, that is, can establish synchronization with the CACH information periodically transmitted by the relay station. For example, the DMR private network communication terminal may record the time when the CACH information is monitored, a lapse of 2.5 ms after the time indicates a time slot identified by the CACH information, and a lapse of 30 ms after the time indicates another CACH information, and a lapse of 32.5 ms after the time indicates another time slot. On the analogy of this, the DMR private network communication terminal can establish synchronization with the relay station 210, that is, establish synchronization with the CACH information periodically transmitted. The method relating to monitoring the CACH information has been described in the prior art, so it is omitted herein.

Next, at a next step 306, an initiating terminal locks an idle time slot based on the CACH information. As described above, CACH information includes time slot number and occupant condition of the time slot as identified, so the idle time slot can be locked based on the CACH information.

Next, at a next step 308, the initiating terminal initiates DMR private network communication in the locked idle time slot. The method relating to initiating a private network communication has been specifically described in the prior art, so it is omitted herein. It shall be noted that in relay mode, the initiating terminal transmits and receives DMR relay communication using upper and lower channels with different frequencies. Therefore, it shall be appreciated that the initiating terminals initiates the DMR private network communication in the idle time slot in the upper channels.

Next, at a next step 310, the relay station receives DMR private network communication from the initiating terminal to determine which time slot it occupies. Since the initiating terminal has established synchronization with the relay station through the CACH information transmitted periodically by the relay station, the relay station can determine which time slot it occupies after the reception of the DMR private network communication from the initiating terminal.

Next, at a next step 312, the relay station forwards the DMR private network communication in the determined time slot. Specifically, the relay station forwards the DMR private network communication in the time slot.

Next, at a next step 314, the destination terminal of the DMR private network communication receives the DMR private network communication to determine which time slot it occupies.

Next, at a next step 316, the destination terminal makes a response for the received DMR private network communication in the time slot.

After a reception of responses made by the destination terminal, the initiating terminal determines a corresponding time slot based on the method used by the destination terminal to make a response, thereby ensuring that this DMR private network communication is always transmitted in the time slot occupied when it is initiated.

At last, the method 300 ends at step 318.

As can be seen from the above description, DMR private network communication transmits through the same time slot in the processing of initiating and responding, and a case of transmission through different time slots in the processing of initiating and responding can be avoided to keep another time slot idle. Accordingly, other DMR private network communication terminals can initiate new DMR private network communication by monitoring idle time slot.

The present invention further provides DMR private network communication system corresponded to the above method. It will be explained in conjunction with FIG. 4 hereinafter.

Figure 4:
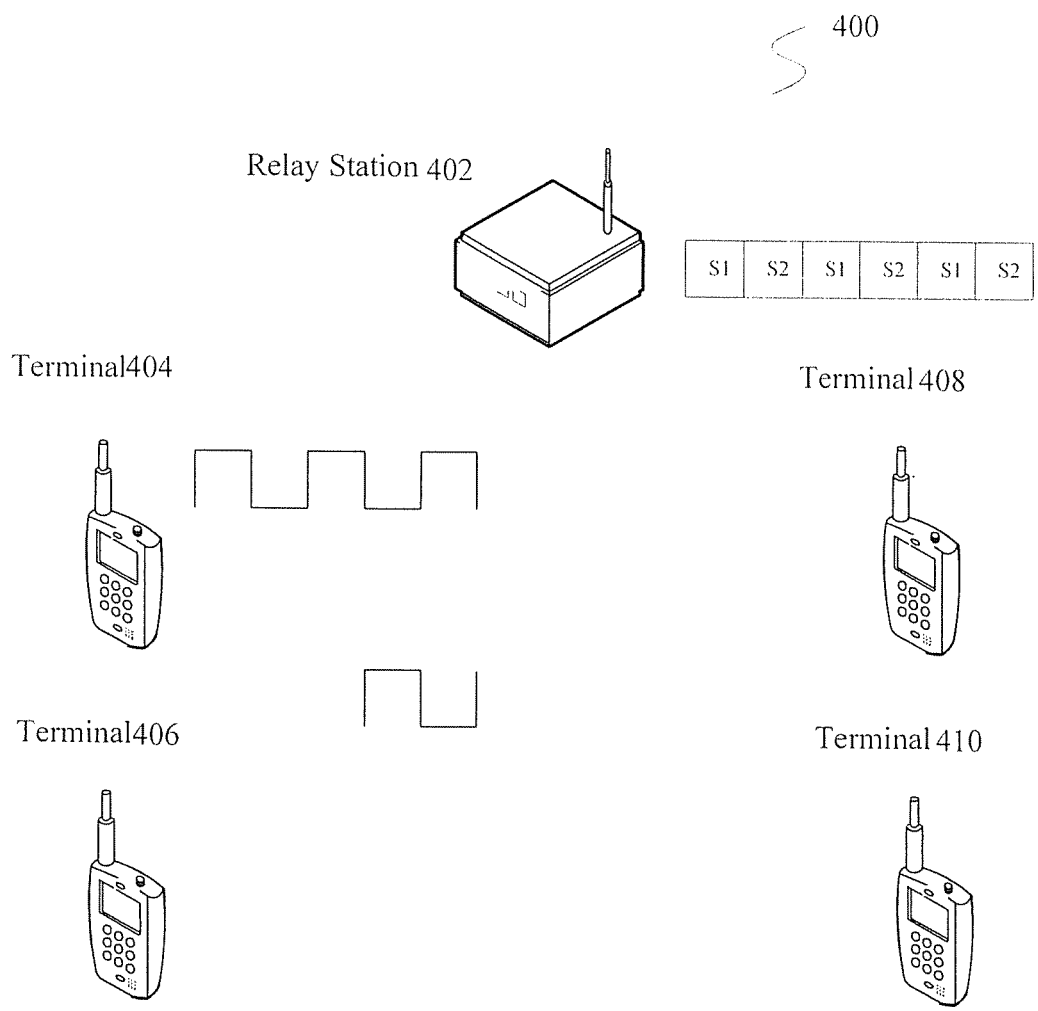
FIG. 4 is a structurally schematic view of the DMR private network communication system according to a preferred embodiment of the present invention.

FIG. 4 is a structurally schematic view of the DMR private network communication system 400 according to a preferred embodiment of the present invention. As shown in FIG. 4, the DMR private network communication system 400 includes a relay station 402 and a plurality of DMR private network communication terminals such as terminals 404-410.

The relay station 402 is used to transmit CACH information periodically, receive and forward the DMR private network communication. As described above, the relay station 402 transmits a piece of CACH information in a length of 2.5 ms at intervals of 27.5 ms. The content relating to CACH information has been explained clearly on the above, so it is omitted here.

After a reception of the DMR private network communication, the relay station 402 determines which time slot it occupies and forwards the DMR private network communication in the time slot.

The DMR private network communication terminals such as terminals 404-410 are used to receive CACH information transmitted periodically by the relay station 402, so as to establish synchronization with the CACH information, that is, establish synchronization with the relay station 402. Subsequently, in case of reception of the DMR private network communication (it may be an initiated private network communication, or a responding relay communication), DMR private network communication terminals determine the time slot thereof and make a response to the DMR private network communication in the time slot. The content relating to establishing synchronization has been explained clearly on the above, so it is omitted here.

When initiating DMR private network communication, the DMR private network communication terminals lock an idle time slot based on the received CACH information and initiate DMR private network communication in the idle time slot.

As illustrated in FIG. 4, when the terminal 404 communicates with the terminal 408 through a time slot S1, the terminal 406 can determine that a time slot S2 is idle by monitoring CACH information, then it initiates new private network communication to terminal 410 using the time slot S2. In this case, the two time slots of the DMR TDMA frame are used sufficiently, and each terminal is not limited to use one fixed time slot therein only.

Figure 5:
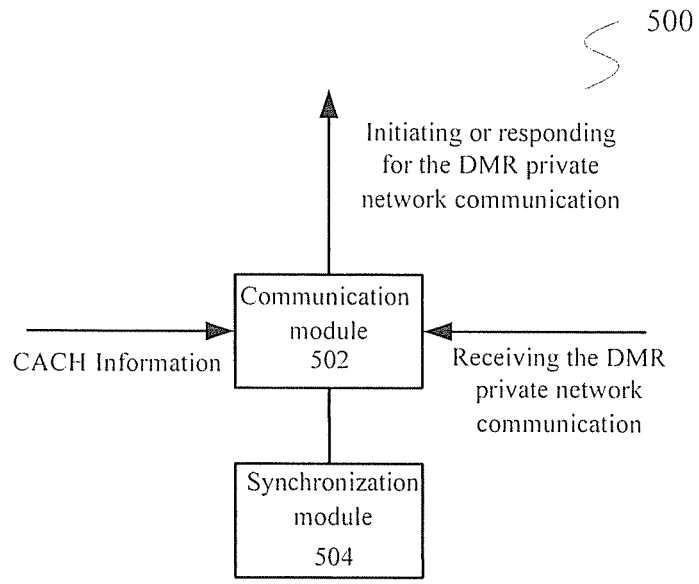
FIG. 5 is a structurally schematic view of the DMR private network communication terminals according to a preferred embodiment of the present invention.

The present invention further provides a DMR private network communication terminal, and it is explained in detail in conjunction with FIG. 5.

FIG. 5 is a structurally schematic view of the DMR private network communication terminal 500 according to a preferred embodiment of the present invention. As shown in FIG. 5, the DMR private network communication terminal 500 includes a communication module 502 and a synchronization module 504.

The communication module 502 is used to receive CACH information, and receive and transmit DMR private network communication, and the step of receiving and transmitting includes receiving DMR private network communication, initiating or responding for DMR private network communication. The contents relating to receiving CACH information and receiving and transmitting DMR private network communication have been disclosed clearly in the prior art, so they are omitted herein.

The synchronization module 504 is used to analyze the periodical CACH information received by the communication module 502 so as to establish synchronization with the CACH information. Meanwhile, the synchronization module 504 is used to resolve the time slot number and the occupant condition in the CACH information.

When initiating the DMR private network communication, the synchronization module 504 locks an idle time slot based on the CACH information and controls the communication module 502 to initiate DMR private network communication in the idle time slot.

When receiving the DMR private network communication, the synchronization module 504 determines which time slot the DMR private network communication occupies, and controls the communication module 502 to make a response for the DMR private network communication in the idle time slot.

The present invention further provides a DMR private network communication relay station which will be explained hereinafter in detail in conjunction with FIG. 6.

Figure 6:
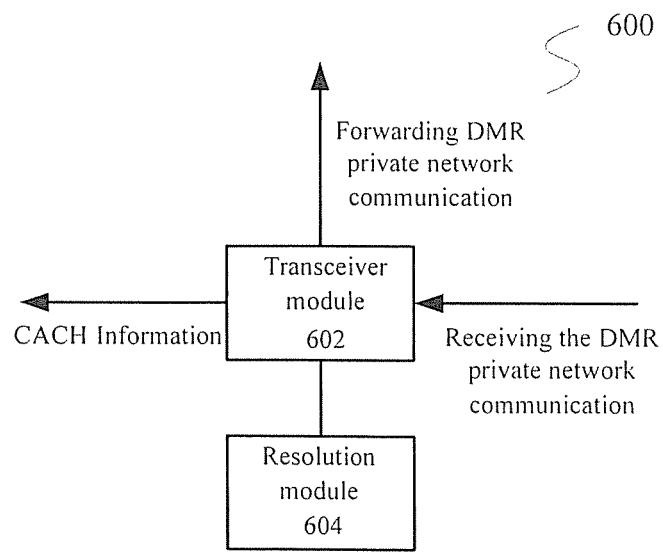
FIG. 6 is a structurally schematic view of the DMR private network communication relay station according to a preferred embodiment of the present invention.

FIG. 6 is a structurally schematic view of the DMR private network communication relay station 600 according to a preferred embodiment of the present invention. As shown in FIG. 6, the DMR private network communication relay station 600 includes a transceiver module 602 and an resolution module 604.

The transceiver module 602 is used to transmit CACH information periodically, receive and forward the DMR private network communication. As described above, the transceiver module 602 transmits a piece of CACH information at intervals of 27.5 ms. The contents relating to receiving and forwarding DMR private network communication have been disclosed clearly in the prior art, so they are omitted hereinafter.

The resolution module 604 is used to receive the DMR private network communication and determine which time slot it occupies, and then forward the DMR private network communication in the time slot.

While there have been described what are at present considered to be the preferred embodiments of the invention, and they are not used to limit the present invention. Various changes, equivalent replacements and modifications fall within the scope of the invention.

What is claimed is:

1. A DMR private network communication terminal for implementing DMR private network communication in relay mode, comprising:
    a communication module for receiving CACH information and receiving and transmitting DMR private network communication, characterized in that the communication module further comprises:
    a synchronization module for establishing synchronization and determining which time slot the received DMR private network communication occupies based on the received CACH information; controlling the communication module to make a response for the received DMR private network communication in the time slot occupied by the received DMR private network communication; and determining an idle time slot of two time slots based on the received CACH information in the case that another time slot of two time slots is occupied by the received DMR private network communication, and controlling the communication module to initiate DMR private network communication in the determined idle time slot.

2. A DMR private network communication system for implementing DMR private network communication in relay mode, at least comprising:
    a first DMR private network communication terminal;
    a second DMR private network communication terminal;
    DMR private network communication relay station for transmitting CACH information periodically;
    the first DMR private network communication terminal and the second DMR private network communication terminal for receiving CACH information to establish synchronization with the DMR private network communication relay station based on the CACH information;
    the first DMR private network communication terminal for initiating DMR private network communication; and
    the DMR private network communication relay station for receiving the DMR private network communication and forwarding the received DMR private network communication to the second DMR private network communication terminal;
    the second DMR private network communication terminal for receiving the DMR private network communication forwarded by the DMR private network communication relay station to make a response for the received DMR private network communication, characterized in that:
    the first DMR private network communication terminal for determining an idle time slot based on the received CACH information in the case that another time slot of two time slots is occupied by the received DMR private network communication and initiates the DMR private network communication in the determined idle time slot;
    the DMR private network communication relay station for receiving the DMR private network communication and determining which time slot the DMR private network communication occupies to forward the received DMR private network communication in the time slot occupied by the received DMR private network communication; and
    the second DMR private network communication terminal for receiving the DMR private network communication forwarded by the DMR private network communication relay station to determine which time slot it occupies and then making a response for the DMR private network communication in the time slot occupied by the received DMR private network communication.

3. An implementation method for DMR private network communication for implementing DMR private network communication in relay mode, characterized by comprising the following steps:
    S1, determining an idle time slot based on the received CACH information in the case that another time slot of two time slots is occupied by the received DMR private network communication and initiating DMR private network communication in the determined idle time slot;
    S2, receiving the DMR private network communication to determine which time slot the DMR private network communication occupies and forwarding the DMR private network communication in the time slot occupied by the received DMR private network communication; and
    S3, receiving the forwarded DMR private network communication to determine which time slot the forwarded DMR private network communication occupies and making a response for the DMR private network communication in the time slot occupied by the received DMR private network communication.

4. The implementation method for DMR private network communication according to claim 3, characterized by further comprising the following step before the step S1:
    S11, receiving CACH information to establish synchronization based on the CACH information.

* * * * *